(12) United States Patent
Poutiainen

(10) Patent No.: US 11,202,956 B2
(45) Date of Patent: Dec. 21, 2021

(54) TRICK SCOOTER

(71) Applicant: INDO SOLUTIONS OY, Kirkkonummi (FI)

(72) Inventor: Aleksi Poutiainen, Kirkkonummi (FI)

(73) Assignee: INDO SOLUTIONS OY, Kirkkonummi (FI)

(*) Notice: Subject to any disclaimer, the term of this patent is extended or adjusted under 35 U.S.C. 154(b) by 0 days.

(21) Appl. No.: 16/652,496

(22) PCT Filed: Jun. 6, 2019

(86) PCT No.: PCT/FI2019/050438
§ 371 (c)(1),
(2) Date: Mar. 31, 2020

(87) PCT Pub. No.: WO2019/243660
PCT Pub. Date: Dec. 26, 2019

(65) Prior Publication Data
US 2021/0093942 A1 Apr. 1, 2021

(30) Foreign Application Priority Data
Jun. 20, 2018 (FI) .................................... 20185557

(51) Int. Cl.
*A63C 5/06* (2006.01)
*A63B 71/00* (2006.01)
*A63B 5/11* (2006.01)

(52) U.S. Cl.
CPC ............ *A63C 5/06* (2013.01); *A63B 71/0054* (2013.01); *A63B 5/11* (2013.01); *A63B 2071/0063* (2013.01); *A63B 2209/00* (2013.01)

(58) Field of Classification Search
CPC ......... A63C 5/06; A63C 5/03; A63B 71/0054; A63B 5/11; A63B 2017/00; A63B 2209/00
(Continued)

(56) References Cited

U.S. PATENT DOCUMENTS

| 6,139,031 | A | 10/2000 | Wingard |
| 2005/0017463 | A1* | 1/2005 | Kane ................. A63B 69/0093 280/14.22 |
| 2010/0164193 | A1 | 7/2010 | Abel et al. |

FOREIGN PATENT DOCUMENTS

| CN | 2435313 | 6/2001 |
| CN | 204473017 | 7/2015 |

(Continued)

OTHER PUBLICATIONS

How to Tailwhip on a Tramp Scooter https://www.youtube.com/watch?v=LBfakJS_mHM Whole Video (Year: 2011).*

(Continued)

*Primary Examiner* — John E Simms, Jr.
*Assistant Examiner* — Rayshun K Peng
(74) *Attorney, Agent, or Firm* — Nixon & Vanderhye PC

(57) ABSTRACT

A trick scooter comprising a base plate, a support member, comprising a first end and a second end, a handle, comprising a first end and a second end, wherein the handle is attached to the second end of the support member. Furthermore, the base plate is manufactured of elastic and flexible material. Such a trick scooter is advantageous as it is lightweight, easy and safe to handle and does not damage the surroundings or cause injury to people nearby.

7 Claims, 6 Drawing Sheets

(58) Field of Classification Search
USPC .......................................................... 434/29
See application file for complete search history.

(56) References Cited

FOREIGN PATENT DOCUMENTS

| | | | |
|---|---|---|---|
| JP | 2001-310008 | | 11/2001 |
| JP | 2001310008 A | * | 11/2001 |
| KR | 20-0237543 | | 10/2001 |
| KR | 2003-0039407 | | 5/2003 |
| KR | 20030039407 A | * | 5/2003 |
| WO | 03/072415 | | 9/2003 |

OTHER PUBLICATIONS

JP 2001310008 Translation.*
International Search Report for PCT/FI2019/050438, dated Sep. 30, 2019, 3 pages.
Written Opinion of the ISA for PCT/FI2019/050438, dated Sep. 30, 2019, 7 pages.
Search Report for FI20185557, dated Dec. 19, 2018, 2 pages.
Steamk04, "How to make a tramp scooter", YouTube [online] [video]: published Sep. 16, 2012, retrieved Dec. 17, 2018, https://www.youtube.com/watch?y=6Pc-aoZYcn0, 3 pages.
Pengelly, "How to Tailwhip on a Tramp Scooter", YouTube [online] [video]: published Jul. 29, 2011, retrieved Dec. 17, 2018, https://www.youtube/com/watch?v=LBfakJS_mHM, 1 page.
Amazon shop (by Department Sports & outdoors); published Mar. 9, 2016; [retrieved Dec. 17, 2018]; https://www.amazon.com.Plastic-Skateboard-Penny-Street-Cruiser/dp/B011MMDL1Y, 2 pages.
Extended European Search Report issued in EP App No. 19823731.5 (dated Mar. 18, 2021).

* cited by examiner

TRICK SCOOTER

This application is the U.S. national phase of International Application No. PCT/FI2019/050438 filed 6 Jun. 2019, which designated the U.S. and claims priority to FI Patent Application No. 20185557 filed 20 Jun. 2018, the entire contents of each of which are hereby incorporated by reference.

FIELD OF THE INVENTION

The present invention relates to a trick scooter.

BACKGROUND OF THE INVENTION

A generally known scooter comprises a handle, a support member, a base plate and a set of wheels. These scooters are used for transportation and for performing a variety of tricks. One of the disadvantages associated with the known scooter is that, when practicing said tricks, the frequently hard and stiff base plate may cause injuries to the user and others or damage the surroundings. In addition, if practice takes place indoors or on a trampoline, for instance, the traditional scooter is prone to cause denting on the floor or damage on the trampoline.

BRIEF DESCRIPTION OF THE INVENTION

An object of the present invention is thus to provide a trick scooter so as to overcome at least some of the above disadvantages. The objects of the invention are achieved by a trick scooter which is characterized by what is stated in the independent claim 1. The preferred embodiments of the invention are disclosed in the dependent claims.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
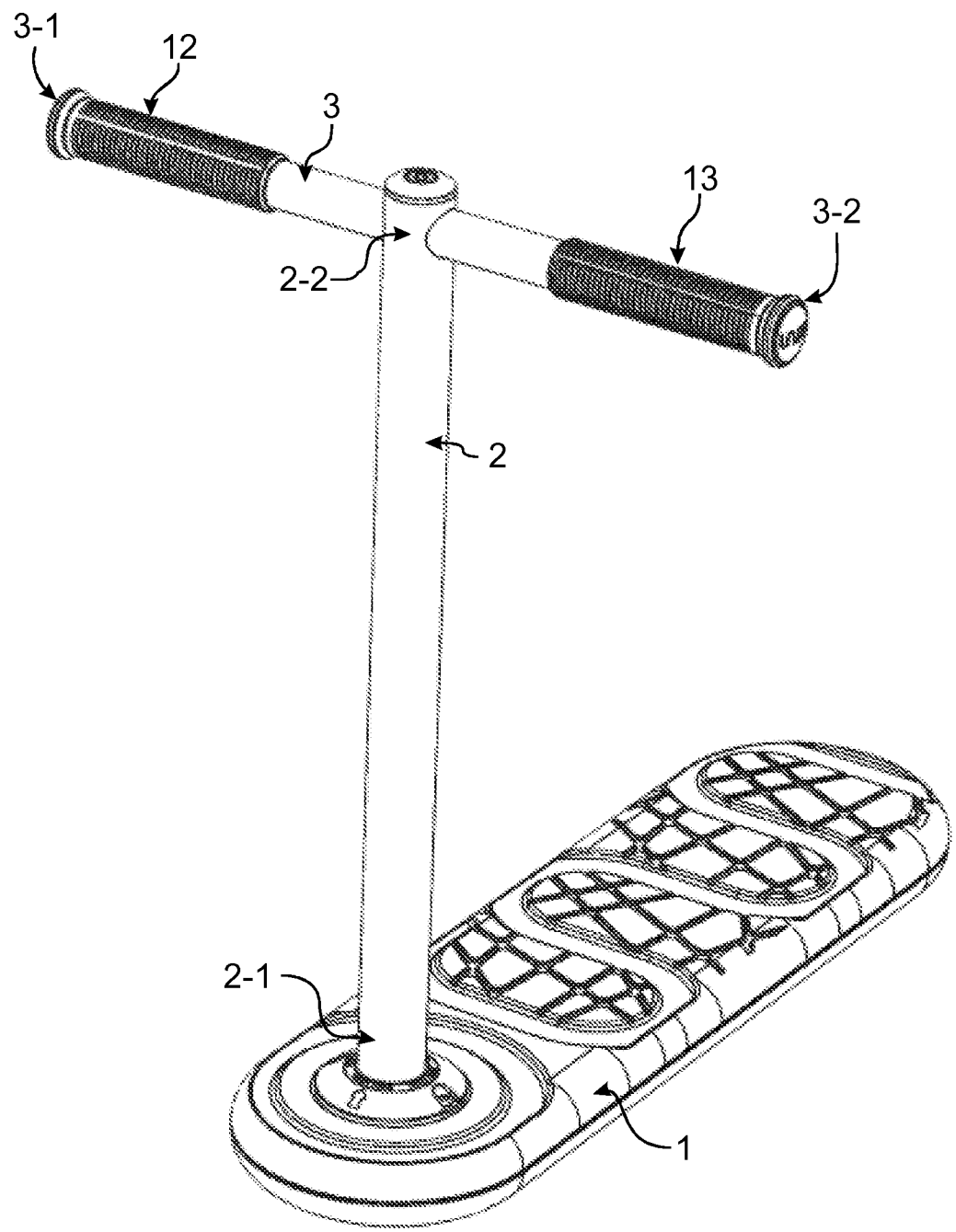
FIG. 1 is an overview drawing of an assembled trick scooter according to a first embodiment.

FIG. 1 is an overview drawing of an assembled trick scooter according to a first embodiment. A trick scooter of FIG. 1 comprises a base plate 1, a support member 2 comprising a first end 2-1 and a second end 2-2, and a handle 3 comprising a first end 3-1 and a second end 3-2, attached to the second end 2-2 of the support member 2.

In the example of FIG. 1, the support member 2 is a tube. Furthermore, the base plate 1 may be manufactured of elastic and flexible material. Examples of such materials include polyethylene foam, for instance. Manufacturing the base plate 1 from an elastic and flexible material, that is also soft, is advantageous, as practicing with such a trick scooter is safer to the surroundings as well as to people nearby. In addition, damage to surroundings is less likely to happen when practicing with a trick scooter, where the base plate is manufactured from an elastic and flexible material.

In the embodiment shown in FIG. 1, the trick scooter further comprises a first plug 12 and a second plug 13 arranged to the first end 3-1 and second end 3-2 of the handle 3, respectively, when the trick scooter is assembled. The first plug 12 and the second plug 13 may be manufactured from silicone, for instance.

In the embodiment shown in FIGS. 1-6, the first end of the support member 2 is rotatably attached to the base plate 1 with a bearing arrangement. The bearing arrangement comprises a plate 6, a through hole 9 on the first end 2-1 of the support member 2, a pin 10, and a cover 11.

Figure 2:
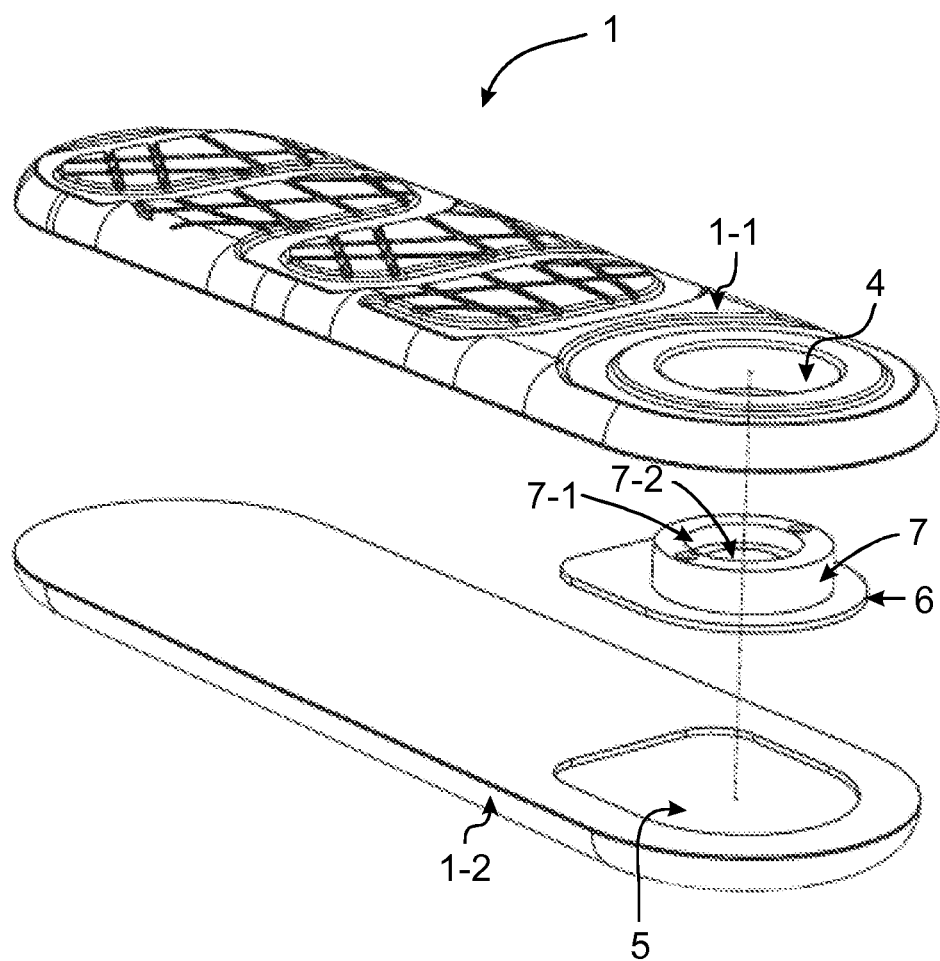
FIG. 2 is an exploded drawing of a base plate and a plate according to the first embodiment.

FIG. 2 is an exploded drawing of the base plate 1 and the plate 6 according to the first embodiment. The base plate 1 comprises a first half 1-1 and a second half 1-2 wherein the first half 1-1 comprises a through hole 4 and the second half 1-2 comprises a recess 5. Furthermore, the plate 6 comprises a protruding part 7 with a first circular recess 7-1 and a second circular recess 7-2, wherein the diameter of the first circular recess 7-1 is larger than the diameter of the second circular recess 7-2. In FIG. 2, the plate 6 is arranged between the first half 1-1 and the second half 1-2 of the base plate 1 in the recess 5 of said second half 1-2 such that the protruding part 7 of the plate 6 is arranged to protrude into the through hole 4 of the first half 1-1.

Figure 3:
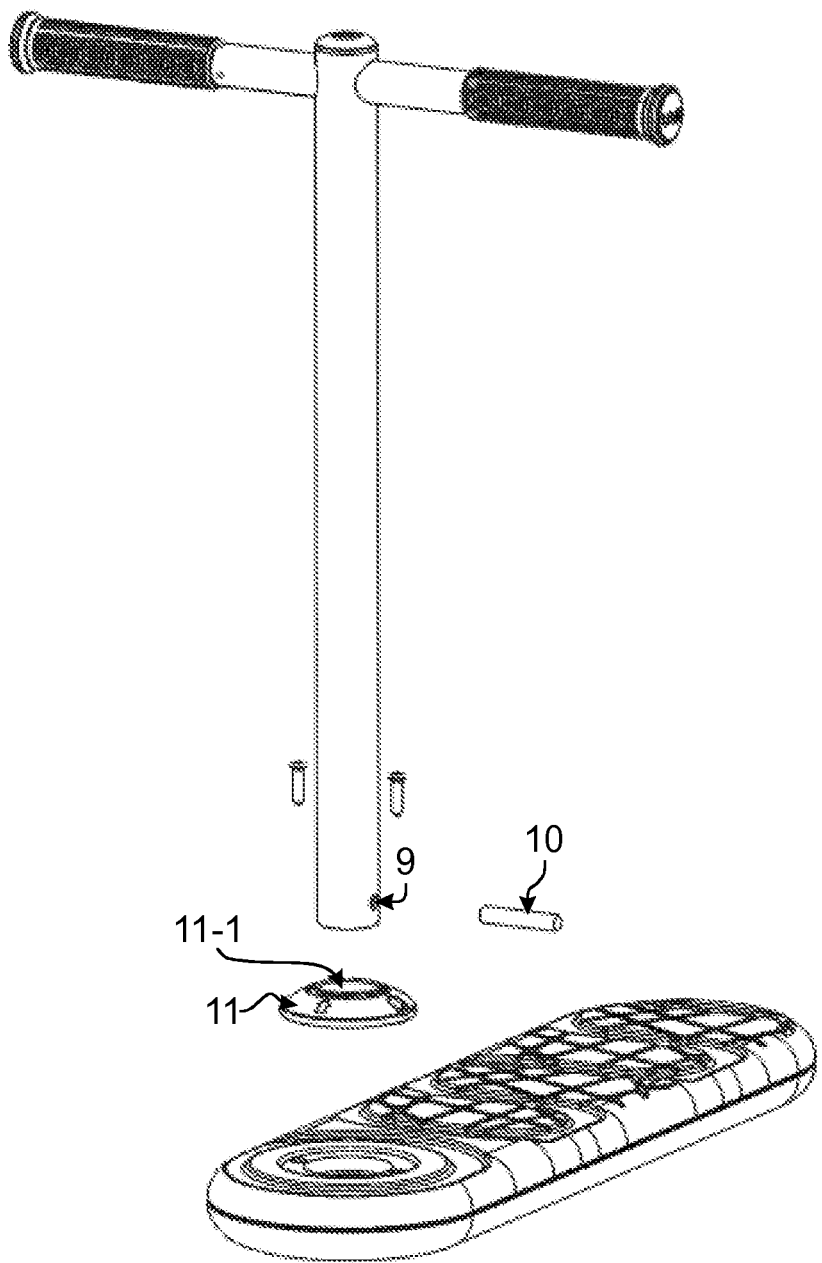
FIG. 3 is an exploded view of a bearing arrangement according to the first embodiment.

FIG. 3 is an exploded view of the bearing arrangement according to the first embodiment, showing the through hole 9 on the first end 2-1 of the support member 2, the pin 10 and the cover 11 with an opening 11-1. The trick scooter of FIG. 3 is assembled by inserting the first end 2-1 of the support member 2 through the opening 11-1 of the cover 11 and arranging the pin 10 through the hole 9 of the first end 2-1 of the support member 2. The support member 2 is then fitted into the second recess 7-2 of the protruding part 7 of the plate 6, which plate 6 in FIG. 3 is placed between the first half 1-1 and the second half 1-2 of the base plate 1 (not visible). Finally, the cover 11 is removably attached to the protruding part 7 of the plate 6. In the example of FIG. 3, the cover 11 is attached with fasteners but other alternatives are possible as well.

Figure 4:
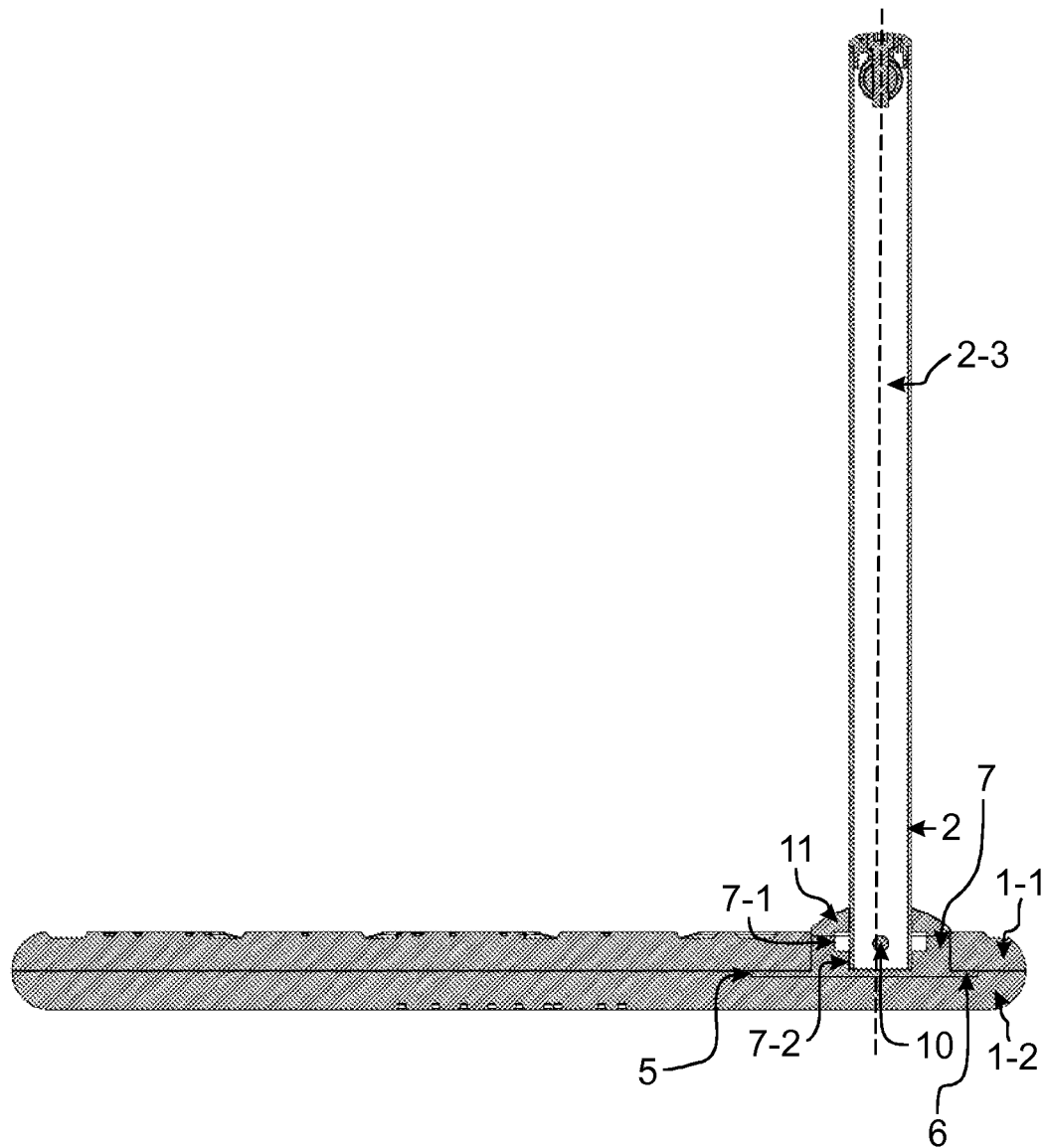
FIG. 4 is a cross-section side view drawing of an assembled trick scooter according to the first embodiment.

FIG. 4 is a cross-section side view drawing of an assembled trick scooter according to the first embodiment. In FIG. 4, the cover 11 is surrounding the first end 2-1 of the support member 2 and the support member 2 is rotatably attached to the plate 6 with the pin 10 and the cover 11. The pin 10 and the cover 11 prevent the support member 2 from sliding apart from the base plate 1.

When the support member 2 is rotated around its longitudinal axis 2-3, the pin 10 is able rotate in a space delimited by the cover 11 and the first recess 7-1 of the protruding part 7. FIG. 4 also shows that the plate 6 is placed in the recess 5 of the second half 1-2 of the base plate 1 and that the support member 2 is placed in the second recess 7-2 of the protruding part 7.

In the above-described bearing arrangement, the support member 2 does not extend through the base plate 1 or the plate 6. This is advantageous, as such an arrangement prevents damage caused by the first end 2-1 of the support member 2 to the floor of a room, for instance. The elastic, flexible and soft material of the base plate also helps to prevent denting of the floor.

Figure 5:
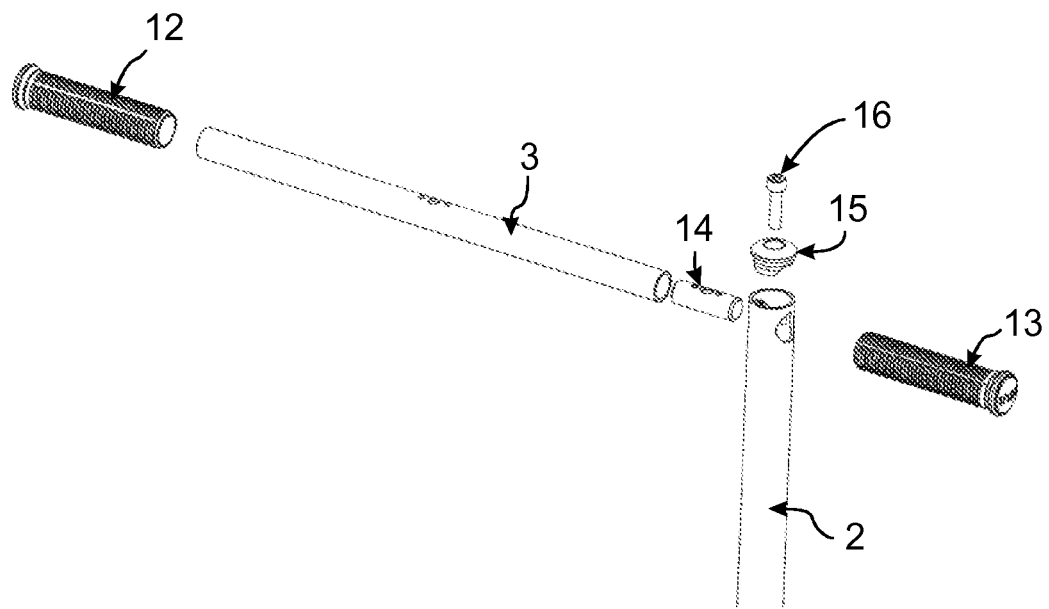
FIG. 5 is an exploded drawing of a handle assembly according to the first embodiment.

FIG. 5 is an exploded drawing of a handle assembly according to the first embodiment. In FIG. 5, the handle 3 is attached to the support member 2 via a connecting piece 14, a cap 15 and a fastener 16.

Figure 6:
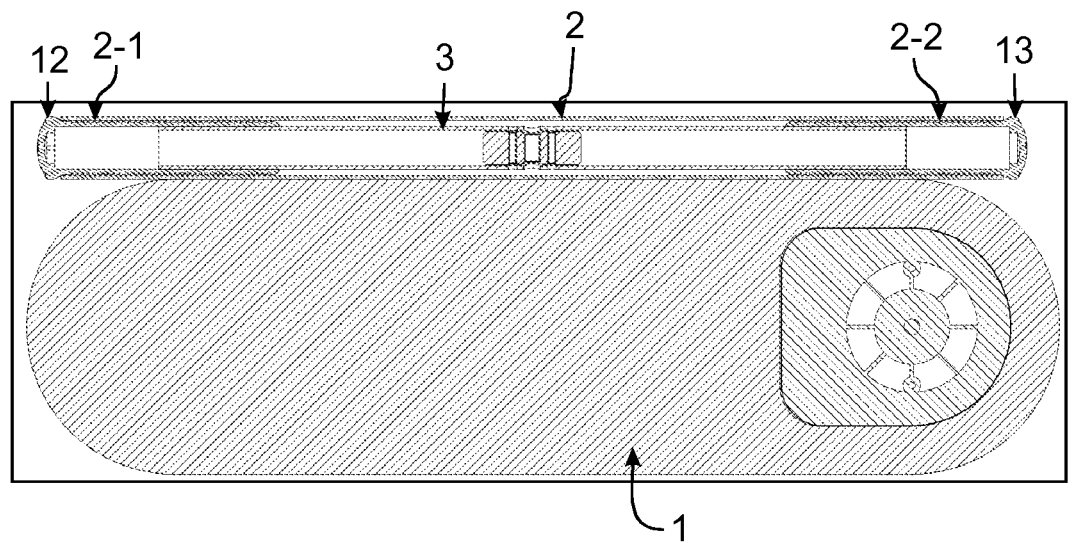
FIG. 6 is a cross-section drawing illustrating an example of packing of a trick scooter according to the first embodiment.

FIG. 6 is a cross-section drawing illustrating an example of packing of a trick scooter according to the first embodiment. In the example of FIG. 6, the support member 2 is hollow and has a larger inner diameter than the outer diameter of the handle 3 for receiving the handle 3 into the support member 2 during packing. The first plug 12 and the second plug 13 have a respective section with an outer diameter substantially corresponding to the inner diameter of the support member 2 for being received into a respective end of the support member 2 to enclose and retain the handle 3 within the support member 2, when the disassembled trick scooter is enclosed in a packing. Such a dimensioning is advantageous as it enables compact packing of the disassembled trick scooter.

At least one of the base plate 1, the support member 2 and the handle 3 are preferably manufactured from non-metallic materials. In some implementations, as many of these parts as possible are preferably manufactured from a soft and elastic material in order to avoid injury's to the surroundings or to the user while practising tricks. The base plate 1 may be manufactured form polyethylene foam and the support member 2 and the handle 3 may be of polypropylene, for instance. Such a lightweight construction is advantageous in other ways as well, as it enables easier transportation and safer handling of a trick scooter. Furthermore, the base plate 1 preferably has a substantially flat bottom surface without any protruding wheels. This is advantageous, as tricks may be practised, for instance, indoors or on a trampoline without damaging the practice area with the wheels. A lightweight construction also reduces transportation costs.

In the embodiment of FIGS. 1-6, the support member 2 does not extend through the plate 6 and the protruding part 7 of the plate 6 does not significantly protrude above the base plate 1. In another alternative, the protruding part may be an arch-like part, for instance, wherein a first end of the arch-like part is attached to the plate and a second end extends above the base plate. Furthermore, the second end of the arch-like part may comprise a receiving portion with a recess or a through hole for receiving the first end of the support member. The support member may be rotatably attached to the receiving portion, or alternatively, the first end of the arch-like part may be rotatably attached to the plate, for instance. In yet another alternative, the first end of the support member is attached to the base plate or to the plate and the second end of the support member is rotatably attached to the handle.

It will be obvious to a person skilled in the art that, as the technology advances, the inventive concept can be implemented in various ways. The invention and its embodiments are not limited to the examples described above but may vary within the scope of the claims.

The invention claimed is:

1. A trick scooter, comprising
 a base plate,
 a support member, comprising a first end and a second end,
 a handle, comprising a first end and a second end, attached to the second end of the support member, wherein:
 said base plate is manufactured of elastic and flexible material,
 the base plate comprises a first half and a second half wherein the first half comprises a through hole and the second half comprises a recess,
 the first end of the support member is rotatably attached to the base plate with a bearing arrangement comprising a plate arranged between the first half and the second half of the base plate in the recess such that a protruding part of the plate is arranged to protrude into the through hole of the first half.

2. A trick scooter according to claim 1, wherein:
 the protruding part comprises a first circular recess and a second circular recess, wherein the diameter of the first circular recess is larger than the diameter of the second circular recess,
 the bearing arrangement further comprises:
  a through hole on the first end of the support member,
  a pin arranged through the hole of the first end of the support member, and
  a cover with an opening, surrounding the first end of the support member and removably attached to the protruding part of the plate, and
 the support member is rotatably attached to the plate with the pin and the cover.

3. A trick scooter according to claim 1, wherein said trick scooter further comprises a first plug and a second plug arranged to the first end and second end of the handle, respectively, when the trick scooter is assembled.

4. A trick scooter according to claim 1, wherein the support member is a tube.

5. A trick scooter according to claim 4, wherein: the support member is hollow and has a larger inner diameter than the outer diameter of the handle for receiving the handle into the support member in a packed state
 the first plug and the second plug have a respective section with an outer diameter substantially corresponding to the inner diameter of the support member for being received into a respective end of the support member to enclose and retain the handle within the support member, in the packed state.

6. A trick scooter according to claim 1, wherein at least one of the base plate, the support member and the handle are manufactured from non-metallic materials.

7. A trick scooter according to claim 1, wherein the base plate has a substantially flat bottom surface without any protruding wheels.

* * * * *